United States Patent
Kalish et al.

(10) Patent No.: US 11,412,312 B2
(45) Date of Patent: Aug. 9, 2022

(54) SYSTEM AND METHOD FOR GENERATING CUSTOMIZABLE ENCAPSULATED MEDIA FILES

(71) Applicant: IDOMOO LTD, Hod Hasharon (IL)

(72) Inventors: Danny Kalish, Raanana (IL); Dan Shamir, Raanana (IL)

(73) Assignee: IDOMOO LTD, Hod Hasharon (IL)

(*) Notice: Subject to any disclaimer, the term of this patent is extended or adjusted under 35 U.S.C. 154(b) by 643 days.

(21) Appl. No.: 15/278,254

(22) Filed: Sep. 28, 2016

(65) Prior Publication Data

US 2018/0089194 A1   Mar. 29, 2018

(51) Int. Cl.
| | |
|---|---|
| *H04N 21/854* | (2011.01) |
| *H04N 21/235* | (2011.01) |
| *H04N 19/46* | (2014.01) |
| *H04N 21/2343* | (2011.01) |
| *H04N 19/00* | (2014.01) |
| *G11B 27/031* | (2006.01) |
| *H04L 65/60* | (2022.01) |

(52) U.S. Cl.
CPC ..... *H04N 21/85406* (2013.01); *G11B 27/031* (2013.01); *H04L 65/607* (2013.01); *H04N 19/00* (2013.01); *H04N 19/46* (2014.11); *H04N 21/2353* (2013.01); *H04N 21/234318* (2013.01)

(58) Field of Classification Search
CPC ........ H04N 21/85; H04N 21/23; H04N 19/00; H04N 21/85406; H04N 19/46; H04N 21/234318; H04N 21/2353; G11B 27/031; H04L 65/607
See application file for complete search history.

(56) References Cited

U.S. PATENT DOCUMENTS

| | | | | |
|---|---|---|---|---|
| 6,931,531 B1* | 8/2005 | Takahashi | ............... | H04N 5/913 348/E7.056 |
| 8,234,350 B1* | 7/2012 | Gu | ................. | H04N 21/234309 709/203 |
| 8,666,226 B1* | 3/2014 | Kalish | ................ | H04N 21/2343 386/278 |
| 2005/0131930 A1* | 6/2005 | Jang | ................. | H04N 21/23412 |
| 2007/0005795 A1* | 1/2007 | Gonzalez | ............... | G11B 27/10 709/232 |

(Continued)

*Primary Examiner* — Usmaan Saeed
*Assistant Examiner* — William P Bartlett
(74) *Attorney, Agent, or Firm* — Browdy and Neimark, P.L.L.C.

(57) ABSTRACT

The present invention provides a method for generating customizable and encapsulated media files, said method comprising: determining at least one media unit for encapsulation, each media unit comprising a basic media content. For each of said determined media unit, defining multiple data layers, each layer being associated with a different data type, wherein said defining of said layers comprises: defining media objects of each media unit, defining properties of each defined media object, defining customization rules for said determined at least one media unit, defining dynamic motion rules for at least one of said defined media objects and creating an encapsulated media file containing the at least one media unit and data layers thereof, said encapsulated media file being configured for de-capsulation thereof for playing content thereof, according to the defined layers thereof.

6 Claims, 9 Drawing Sheets

(56) References Cited

U.S. PATENT DOCUMENTS

| | | | |
|---|---|---|---|
| 2014/0040026 A1* | 2/2014 | Swaminathan | G06Q 30/02 705/14.53 |
| 2015/0286716 A1* | 10/2015 | Snibbe | G06F 16/48 707/610 |
| 2017/0180435 A1* | 6/2017 | Edwards | H04L 65/4076 |
| 2017/0201761 A1* | 7/2017 | Walker | H04L 65/4084 |
| 2018/0295400 A1* | 10/2018 | Thomas | H04N 19/30 |

* cited by examiner

Encapsulated Video Builder 200

- Select at least one or more media units 210
- Set priority of each media unit and order of playing video scenes, 220
- Define each media unit as static or dynamic and set media unit parameeters 230
- Set media unit customization rules for diversifying videos based on user profile, context or environment conditions 240
- Incorporate additional media objects into existing media units 250
- Set media object properties/parameters (e.g.: Material, Motion, Lighting) per each layer frame or group of frames based on static customization rules 260
- Set media unit extension features, to globally affect all subsequent media objects 270
- Set media unit object customization rules 275
- Compress media objects data according to appropriate compression rules 280
- Generating encapsulated video file format including, video project data which include all media units parameters and object parameters and Video customization data 290

Figure 3

SYSTEM AND METHOD FOR GENERATING CUSTOMIZABLE ENCAPSULATED MEDIA FILES

FIELD OF THE INVENTION

The present invention relates generally to generation of context based video. More particularly, the present invention relates to encoders for generating encapsulated video files and a decoder-generator module for playing or generating context based videos.

BACKGROUND OF THE INVENTION

Summary of the Invention

The present invention provides a method for generating customizable and encapsulated media files based on pre-defined basic media content. The method comprising:

determining at least one media unit for encapsulation, each media unit comprising a basic media content constructed from video frames and media objects, wherein each frame is constructed of static layers and dynamic layers;

defining media objects of each media unit;

defining properties of each defined media object for each frame in the video based on defined dynamic motion rules and defined customization rules;

creating an encapsulated media file containing the at least one media unit and multiple parameters types data thereof, said encapsulated media file being configured for de-capsulation thereof for playing content thereof by generating the video frames based on the objects parameter data, according to the defined parameters data, defined customization rules of static object properties;

wherein at least one of determining, constructing, defining or creating is performed by at least one processor.

According to some embodiments of the present invention the method further comprising the step of defining each media unit as static or dynamic.

According to some embodiments of the present invention defining of said parameters further includes defining extension functionalities.

According to some embodiments of the present invention defining of said parameters includes defining shader parameters of 3D effects.

According to some embodiments of the present invention defining of said parameter further includes adding binary data of alternative or additional objects or adding external resources links to objects.

According to some embodiments of the present invention the method further comprising the step of determining media units to be played and order of playing based on organization, selection rules using customization parameters retrieved from user profile or entered by the user.

According to some embodiments of the present invention the method further comprising the step of applying compression algorithm on objects data according to pre-defined rules in relation to object type.

The present invention provides a method video generating customized video from an encapsulated video file. The method comprising the steps of:

reading from parameters encapsulation data including at least: material information of objects properties from project data of encapsulated file;

retrieving binary data of objects from encapsulated file or external resources based on network address included in the encapsulated file;

reading relevant customization rules from the encapsulated file;

generating frames by applying generic video script on the object binary data and properties, wherein at each frame are used selected objects properties based on customization rules for dynamic object properties and on target user or environment characteristics;

integrating generated video files into a single sequence of video stream.

According to some embodiments of the present invention the generating at least one video file or stream, comprise the following steps:

a. modifying pre made media units based on retrieved customization rules;

b. defining motion pattern of objects or location of object on the screen layout by applying dynamic data objects motion rules; and c. modifying objects properties based on target user profile or environment characteristics.

According to some embodiments of the present invention the method further comprising the step of applying de-compression according to object type based on predefined rules for each object type.

The present invention provides a system video generating customized video from an encapsulated video file. The system comprised of:

preparation module determining at least one media unit for encapsulation, each media unit comprising a basic media content constructed from video frames, wherein each frame is constructed of static layers and dynamic layers;

wherein for each of said determined media unit frames and layers, defining properties of each defined media object for each frame in the video based on defined dynamic motion rules and defined customization rules; and;

builder module for creating an encapsulated media file containing the at least one media unit and multiple parameters types data thereof, said encapsulated media file being configured for de-capsulation thereof for playing content thereof by generating the video frames based on the objects parameter data, according to the defined parameters data, defined customization rules of static object properties.

According to some embodiments of the present invention the method further comprising organization module to determine media units to be played and order of playing based on organization and selection rules based on customization parameters retrieved from user profile or entered by the user.

According to some embodiments of the present invention, each video can be defined as static or dynamic.

According to some embodiments of the present invention the encapsulation further includes defining extension functionalities.

According to some embodiments of the present invention the encapsulation further includes defining shader parameters of 3D effects.

According to some embodiments of the present invention the system comprising the step of adding binary data of alternative or additional objects or adding external resources links to objects.

According to some embodiments of the present invention the user is enabled to add binary data of alternative or additional objects.

The present invention provides a method for generating customizable and encapsulated media files, said method comprising:

(a) determining at least one media unit for encapsulation, each media unit comprising a basic media content;

(b) for each of said determined media unit, defining multiple data layers, each layer being associated with a different data type, wherein said defining of said layers comprises:
  (i) defining media objects of each media unit;
  (ii) defining properties of each defined media object;
  (iii) defining customization rules for said determined at least one media unit;
  (iv) defining dynamic motion rules for at least one of said defined media objects, and
(c) creating an encapsulated media file containing the at least one media unit and data layers thereof, said encapsulated media file being configured for de-capsulation thereof for playing content thereof, according to the defined layers thereof.

These, additional, and/or other aspects and/or advantages of the present invention are: set forth in the detailed description which follows; possibly inferable from the detailed description; and/or learnable by practice of the present invention.

According to some embodiments, the method further comprises the step of defining each media unit as static or dynamic.

According to some embodiments, the defining of said layers further comprises defining extension functionalities.

According to some embodiments, the defining of said layers further comprises defining shader parameters of 3D effects.

According to some embodiments, the method further comprises the step of adding binary data of alternative or additional objects and/or adding external resources links to objects.

According to some embodiments, the method further comprises the step of determining a media unit to be played and order of playing based on at least one of: organization, selection rules using customization parameters retrieved from user profile or entered by the user.

According to some embodiments, the method further comprises the step of applying a compression algorithm on objects data according to pre-defined rules in relation to object type.

The present invention also provides a method for generating customized videos from encapsulated video files, said method comprising the steps of: (i) reading from a multi-layer encapsulated information including at least: material information of objects properties from project data of encapsulated file; (ii) retrieving binary data of objects from encapsulated file or external resources based on network address included in the encapsulated file; (iii) reading relevant customization rules from the encapsulated file; (iv) generating at least one video file or stream by applying retrieved customization rules using objects binary data and objects properties based on target user or environment characteristics; and (v) integrating generated video files into a single sequence of video stream.

According to some embodiments, generation of at least one video file or stream, is comprised of the following steps:
(a) modifying media based on retrieved customization rules;
(b) defining motion pattern of objects or location of object is the screen layout by applying dynamic layer data objects motion definitions; and (c) modifying objects properties based on target user profile or environment characteristics.

According to some embodiments, the method further comprises the step of applying de-compression according to object type based on predefined rules for each object type.

The present invention further provides a system for generating customized video from encapsulated video files, said system comprising: (i) retrieving module for reading information from multi data layer of encapsulated file by at least reading material information of objects properties from project data of encapsulated file, binary data of objects from encapsulated file or external resources using provided network address and reading relevant customization rules from the encapsulated file; and (ii) creation module for generating at least one video file or stream by applying retrieved customization rules using objects binary data and objects properties based on target user or environment characteristics and integrating generated video files into a single sequence of video stream.

According to some embodiments, the system further comprises an organization module configured to determine media units to be played and order of playing based on organization and selection rules based on customization parameters retrieved from user profile or entered by the user.

According to some embodiments, each media unit can be defined as either static or dynamic.

According to some embodiments, the encapsulation further comprises defining extension functionalities.

According to some embodiments, the encapsulation further comprises defining shader parameters of 3D effects.

According to some embodiments the method further comprises the step of adding binary data of alternative or additional objects or adding external resources links to objects.

According to some embodiments the designer can add binary data of alternative or additional objects.

DESCRIPTION OF THE DRAWINGS

The present invention will be more readily understood from the detailed description of embodiments thereof made in conjunction with the accompanying drawings of which:

FIG. 3 is a flowchart diagram of Encapsulated Video builder module, according to some embodiments of the invention;

DETAILED DESCRIPTION OF SOME EMBODIMENTS OF THE INVENTION

Figure 1:
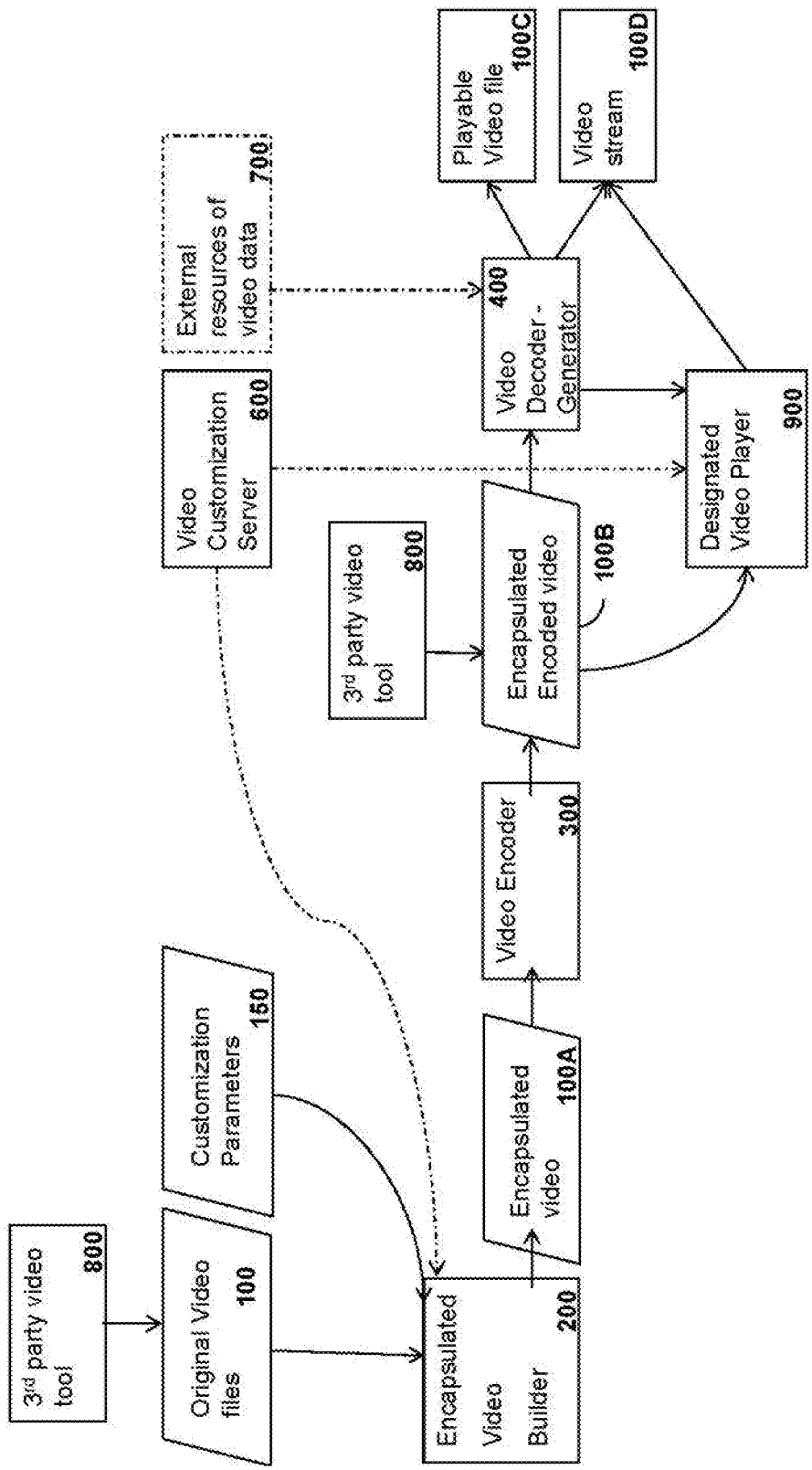
FIG. 1 is a block diagram showing components and environment of a system for generating encapsulated video file, according to some embodiments of the invention.

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting.

The present invention relates to a new format of encoded video data. This new format facilitates the creation of video content in multiple variations and on-the-fly generation of customized and personalized video files. The present invention includes:

- A builder software and interface: Creating and customizing encapsulated video files,
- A video encoding module: Producing compressed video data in the said format, or in other industry acknowledged video formats,
- The said video format: Encompassing video content and customization data,
- A decoder module: Enabling streaming video playback of the said video format,
- A dedicated media player, as an optional viewer of the said video format.

Following is a table of definitions of the terms used throughout this application, adjoined by their properties and examples.

| Term | Definition | Properties | Example |
|---|---|---|---|
| Media Object | Basic building block of video media unit. | Material properties of objects for each frame for each layer of media units, e.g. color, position, visibility, opacity, shape, size etc. Motion properties Special effects properties, e.g.: lighting, shading etc. Each object type may require a different optimal compression rule May be replaced by a "Binary data container", i.e.: objects or links to objects | Blue triangle |
| Media Object configuration parameters | Motion parameters: object's motion in relation to each video frame layers or group of frames Material parameters: properties of objects for each frame, e.g.: color, position, visibility, shape, size Lighting and special effects, e.g. shading | | |
| Media Unit | Basic block of a displayable video sequence. comprised of video frames, each frame comprised of dynamic and static layers Comprised of media objects (see above), this is the basic building block of an encapsulated video file (see below). Media units may be customized either statically or dynamically layers od frames below) to diversify the production of multiple video files | Customization according to Dynamic and static configurations | Blue triangle flying from left to right, presenting the user name and time of day. |
| Video frame | Comprised of dynamic and static layers Each layer comprised of media object | | |
| Media Unit configuration parameters | Environment parameters Context parameters User profile parameters | Environment media unit parameters enable diversifying the video presentation according to external information sources: Context media unit parameters enable diversifying the video presentation according to user profile parameters User profile media unit parameters enable diversifying the video presentation according to user profile parameters: name, age, gender, | Environment parameters: show lighting according to the actual time of day. Context parameters: Personalization parameters: "Hello Mr. Smith. Here is your schedule for today . . . " |
| Extension functionalities | Parameters that apply globally to all media objects that reside hierarchically under a specific media unit. | Global lighting, Global shading, Global motion | Shine all objects from a specific angle |
| Encapsulated video file | A file format, comprised of one or more media units. This format Includes additional customization parameters for: static or dynamic selection of media units to display static or dynamic sorting of media units. | Encapsulated video parameters (select and sort media units) Video Project information Metadata | If played on a Sunday, present media unit #1 before media unit #2. Otherwise-reverse playback order. |
| Encapsulated video Builder | A software tool and UI, designed to assemble and compile Encapsulated video files, encompassing | Backend | |

-continued

| Term | Definition | Properties | Example |
|---|---|---|---|
| | all the information as described above. | | |
| Dynamic Vs. Static customization parameters | Dynamic-media units are presented according to environment parameters (e.g. time of day), Context or user profile configuration parameters (e.g. name of logged in user on the presenting machine). Static-media units are presented according to predefined, global and constant parameters | | |
| Selection customization parameters | Video customization parameters that determine the selection and ordering of media units | | If user's age is below 6 years- show "Sesame Street" |
| Appearance customization parameters | Video customization parameters that affect the video appearance, e.g.: inserting a name, picture etc. | | If user is a boy- show blue background, otherwise show pink background |
| Video customization server | A service designed to provide a mechanism for dynamically changing customization parameters | | |
| Encoder | A software module, designed to encode encapsulated video file formats. The encoder compresses the encapsulated video file according to the type and content of each resident media object, to achieve optimum compression ratios | | |
| Decoder | A software module, designed to present encoded encapsulated video files. The Decoder can produce video data either as: 1 A video file of other industry acknowledged format (e.g. MPEG4) or 2 A direct video stream | Frontend, UI | |

FIG. 1 is a block diagram of the components and the environment of a system for generating encapsulated video files and decapsulization thereof for playing content thereof, according to some embodiments of the invention. The system according to the present invention includes:
i. An Encapsulated video Builder [200], enabling creation of encapsulated video files based on video media units [100], and customization rules. These customization rules may be introduced either via the Builder's interface [150], or via a video customization rules' server [600].
ii. A video Encoder [300], Enables the creation of encoded (i.e. compressed, transferrable, encapsulated video) files. These files are stored in an Encapsulated Video files' repository.
iii. A video decoder-generator [400], for creating playable customized video files [100C] or producing a video stream playback [100D] of the encapsulated video files. The Video Decoder-generator [400] may also use external resources of video data [700].

iv. A designated Video player [900], for playing customized decoded video files [100B] based on the encapsulated video, or providing customized video streams 100D.

According to some embodiments, encapsulated video files [100B] may originate from any third party tool [800] which adopts the encapsulation format as disclosed by the present invention.

Figure 1A:
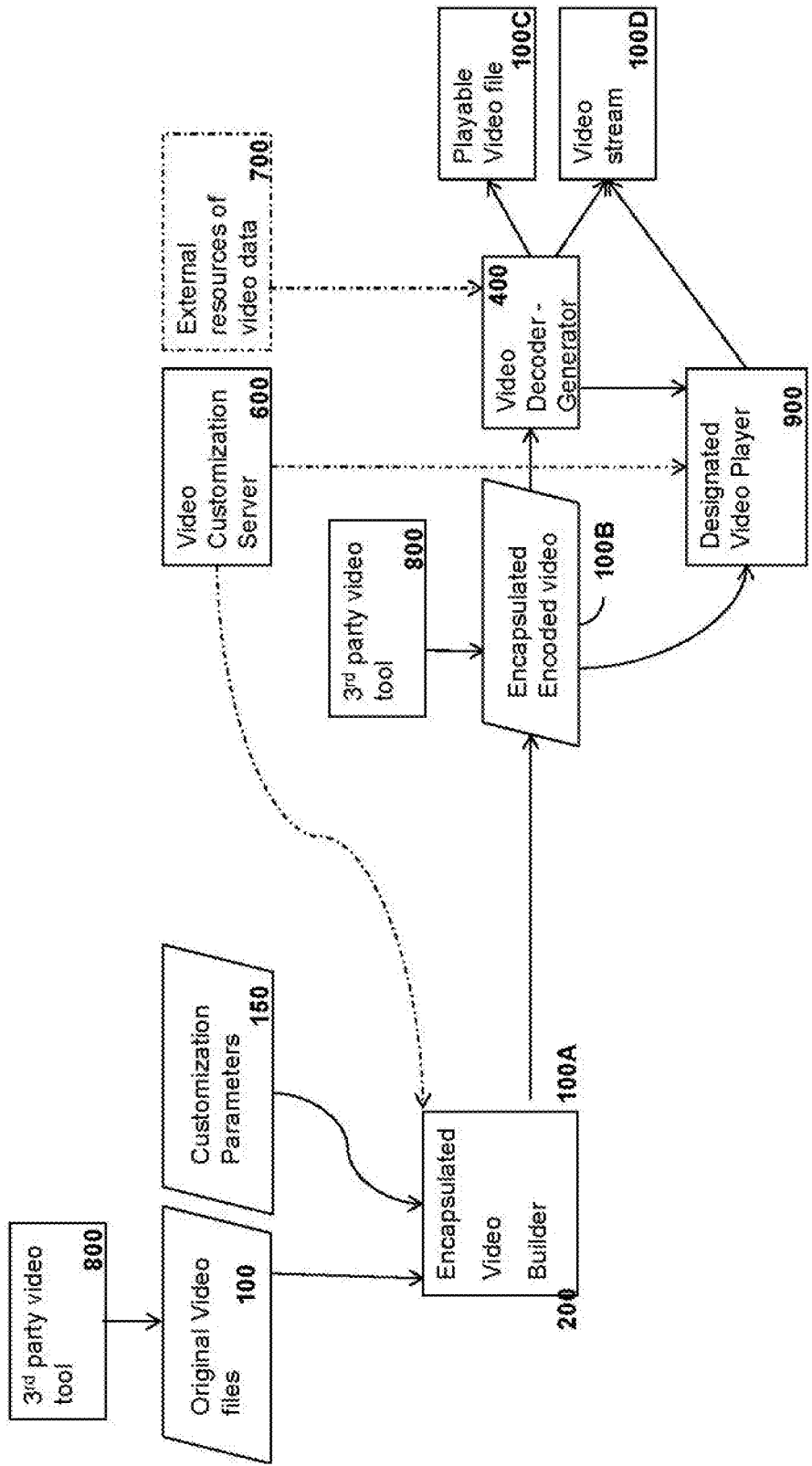
FIG. 1A is a block diagram showing components and environment of a system for generating encapsulated video file, according to some embodiments of the invention.

FIG. 1A is a block diagram of the components and the environment of a system for generating encapsulated video files and decapsulization thereof for playing content thereof, according to some embodiments of the invention. This block diagram is equivalent to the FIG. 1, where the encoding is processed at the builder module, there for the encoding module is redundant.

Figure 2:
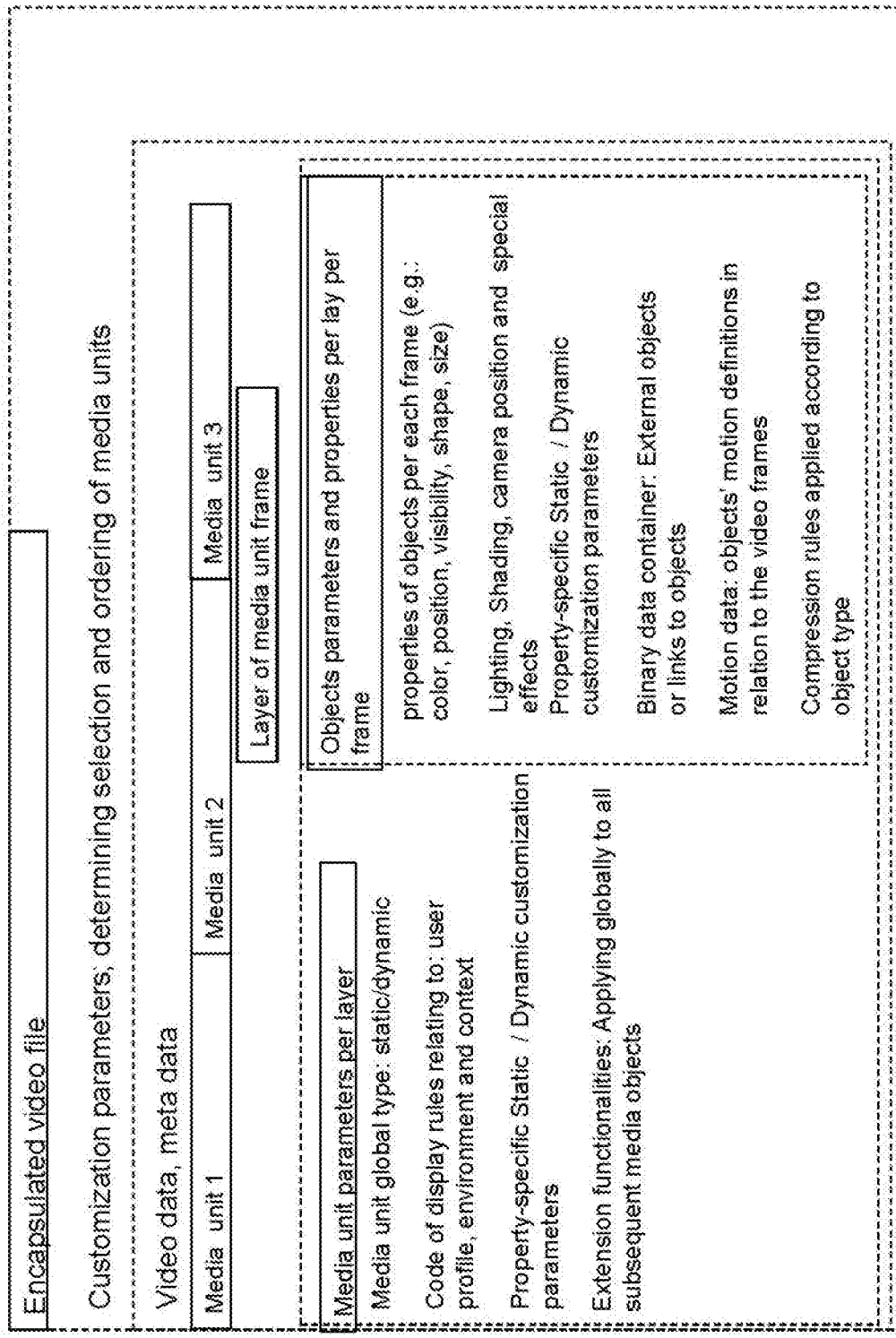
FIG. 2 is a diagram of encapsulated video file format, according to some embodiments of the invention.

FIG. 2 is a diagram of the encapsulated video file format, according to some embodiments of the invention. The encapsulated file format is comprised of at least one media unit. The media unit is comprised of video frames, each frame comprised of static and dynamic layers, each layer having at least one media object (e.g. image). The encapsulated file format also includes file metadata, media unit and media object customization data.

The media unit configuration parameters may be applied to determine rules for video selection, ordering and appearance. These parameters are categorized by:
 a. User profile data, e.g.: age, gender or user preferences
 b. Current context, e.g.: location, . . .
 c. Environmental data, e.g.: time of day, temperature etc.

There are two types of media unit customization rules. These rules are set according the user profile, current context and environment data:
 a. Appearance customization rules: Rules that apply to parameters which have a visible effect on the video, e.g.: inserting a specific username or image in the video sequence.
 b. Selection customization rules: Rules that apply to parameters which determine the media units to be displayed and the order of media unit appearance.

Video customization rules may be applied to media units either dynamically or statically;
 a. Dynamically—media units are presented according to environment parameters (e.g. time of day), Context, and user profile parameters (e.g. name of logged in user on the presenting machine);
 b. Statically—media units are presented according to predefined global and constant parameters.

Selection rules may be applied to media units either dynamically or statically;
 a. Dynamically—media units are selected to be presented, and their order is sorted according to environment parameters, Context, and user profile parameters;
 b. Statically—media units are selected to be presented, and their order is sorted according to predefined global and constant parameters.

Media objects are attributed a dedicated set of parameters. These parameters include:
 a. Material parameters including properties of objects, e.g.: color, position, visibility, shape, size, orientation, etc.;
 b. Special effects parameters, e.g.: lighting, shading, opacity, 3D etc.;
 c. Motion parameters: determining motion rules of objects in relation to each video frame or group of frames; the motion rules may define route or movement pattern in space;
 d. Camera positions and/or movement, light projection;

e. Binary data container: importing objects data or links to objects;

f. Each media object type may require a different optimal compression rule.

According to some embodiments of the present invention, the video encapsulation format as suggested by the present invention may be used by a third party video tool by adapting the encapsulated format structure and features as described above.

The encapsulated file format customization data may be saved on a cloud based infrastructure. Accordingly, the encapsulated file may include only a link to encapsulated file format customization data hosted on a remote server.

Figure 2A:
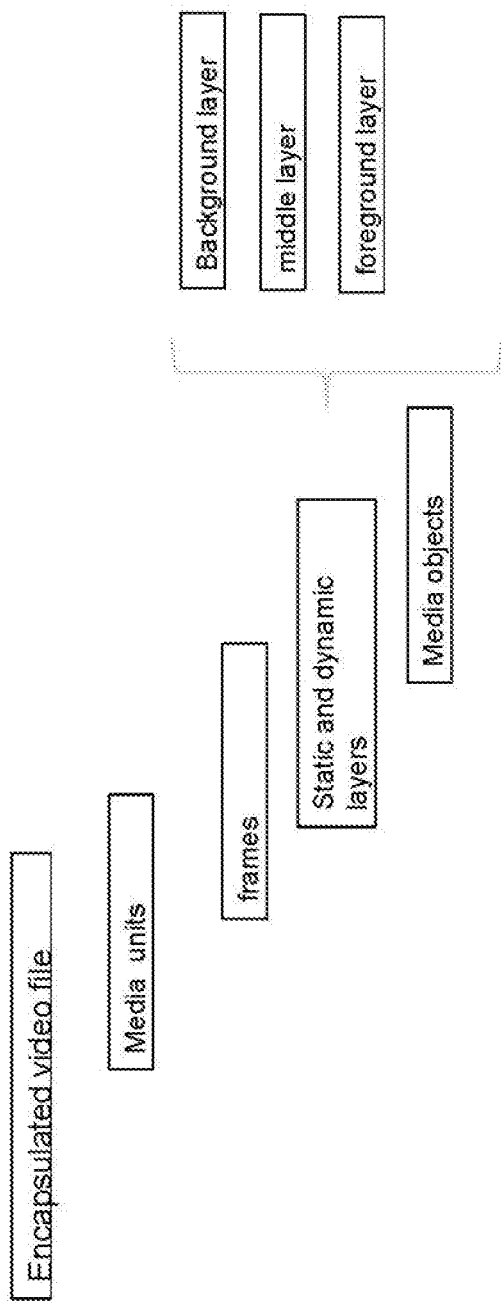
FIG. 2A is a diagram of encapsulated video file structure, according to some embodiments of the invention.

FIG. 2A is a hierarchical structure diagram of the encapsulated video file format, according to some embodiments of the invention. The encapsulated video file format includes multiple media units, each media unit comprised of multiple video frames, each frame comprised of multiple layers: a background static layer, dynamic middle layer and foreground layer.

FIG. 3 is a flowchart of a process carried out by the Encapsulated Video Builder module [200], according to some embodiments of the invention. This software module [200] facilitates the generation of Encapsulated Videos, and enables video designers to accomplish at least one of the following actions:

a. select media units to be played at the encapsulated video file, and determine the order of playing based on organization and selection rules (steps 210, 220), b. define each media unit as either static or dynamic and set each media unit's configuration parameters (i.e.: user profile, context and environmental parameter, step 230), c. set each media unit's customization rules (i.e.: dynamic/static properties of the media unit's configuration parameters, and presentation customization parameters) for diversifying videos based on user profile, context or environment conditions (step 240), d. incorporate binary data such as additional media objects or links to media objects (e.g. from external source or library) into existing media units (step 250), e. set media object properties/parameters (e.g.: Material, Motion, Lighting) per each frame or group of frames based on static customization rules set each media object's configuration parameters (e.g.: material, motion, lighting and special effects' parameters) per each frame and layer, wherein the data is indexed by the frame sequence (step 260), f. set media unit extension features, to globally affect all subsequent media objects parameters, e.g. lighting, shading opacity (step 265), g. compresses Media objects' data according to predefined rules in relation to the object type (step 27), h. set each media object's customization rules as static or dynamic for diversifying videos based on user profile, context or environment conditions (step 280), where the static customization rules define customization of object properties during the encapsulation process and the dynamic customization rules define the customization of object properties during the decoding process, i. generate encapsulated video file format including, video project data which include all media units parameters and object parameters and Video customization data. (step 290).

Figure 3A:
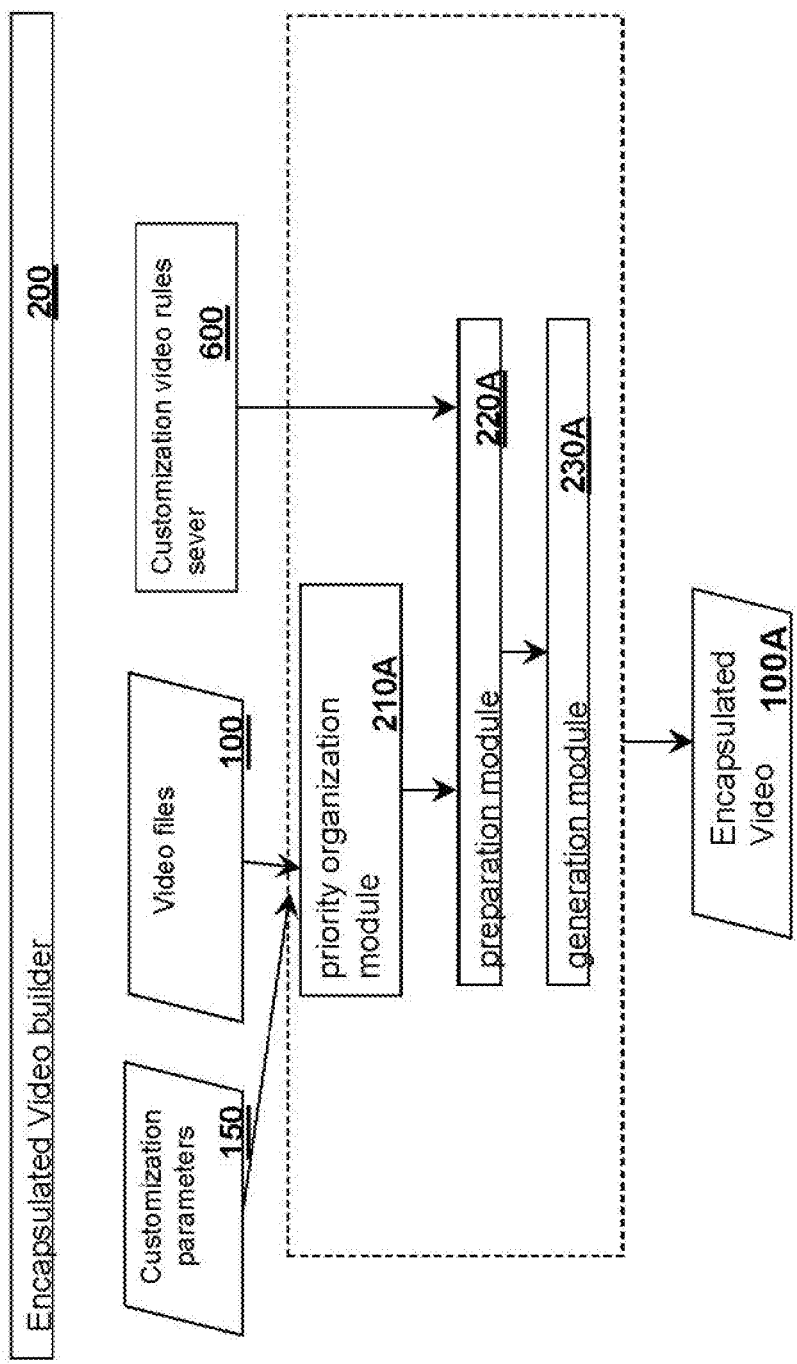
FIG. 3a is a block diagram of Encapsulated Video builder module, according to some embodiments of the invention.

FIG. 3a is a block diagram of an Encapsulated Video Builder module 200, according to some embodiments of the invention. This module includes:

a. a priority organization module 210A for determining media units to be played and the order of playing based on organization and selection rules. These rules are set according to customization parameters, which could be either retrieved from a user's profile, or entered by a user.

b. a preparation module 220A for entering and determining video data by defining or associating configuration parameters and customization rules per each media unit and media object.

c. A generation module 230A for creating encapsulated, encoded video files including video data and video customization data.

Figure 4:
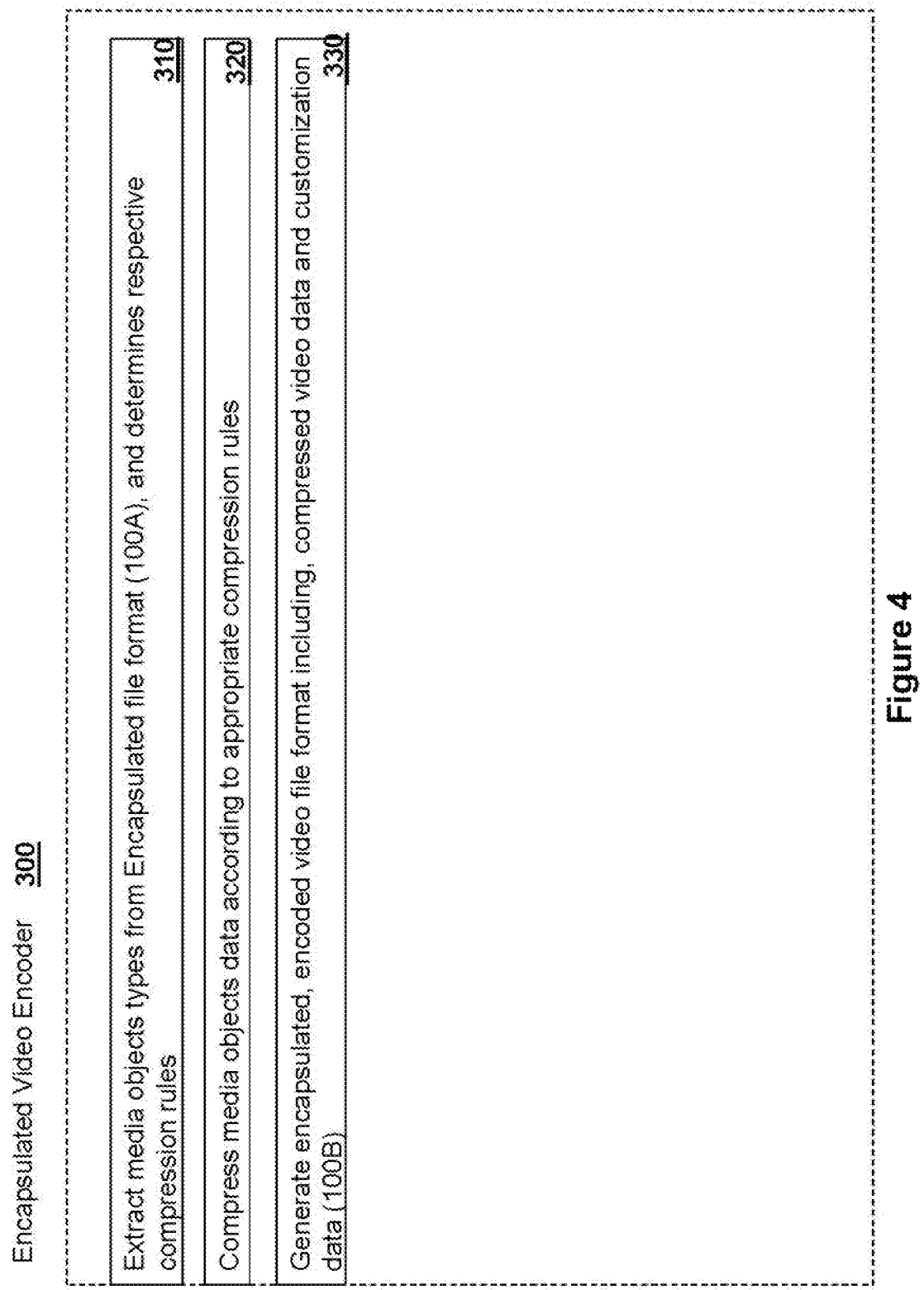
FIG. 4 is a flowchart diagram showing a process carried out by a Video encoder module, according to some embodiments of the invention.

FIG. 4 is a block diagram of an Encapsulated Video Encoder module 300, according to some embodiments of the invention. This module:

a. receives the output of the Encapsulated Video Builder (100A) and determines media objects' compression rules according to their respective types (step 310), b. compresses Media objects' data according to predefined rules in relation to the object type (step 320), c. generates an encoded, encapsulated video file format (100B)—(step 330). This type of file could later be played by designated 3rd party video players (900) or using the video decoder-generator unit (400) as diversified video sequences (100C, 100D).

This module is optional, the compression process can take place at the builder module according to some embodiments of the present invention.

Figure 5:
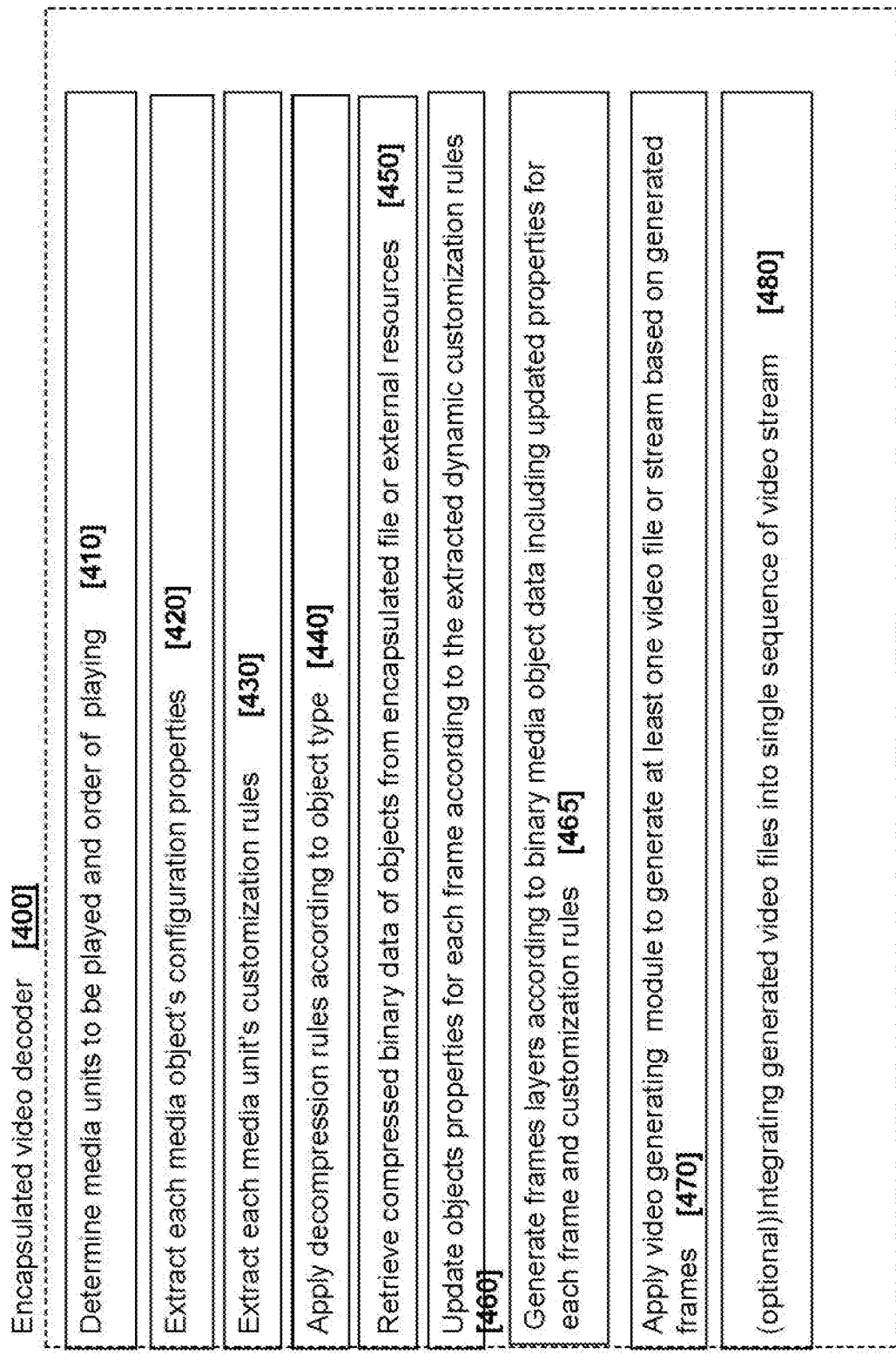
FIG. 5 is a block diagram of Video decoder-generator module in association with the relevant modules, according to some embodiments of the invention.

FIG. 5 is a flowchart of a process carried out by an encapsulated video decoder-generator module 400, according to some embodiments of the invention. This module 400, is comprised of at least one of the following steps:

a. Determine media units to be played and order of playing (step 410) based on organization and selection rules. These rules are set according to customization parameters such as environmental or contextual parameters, retrieved from the user's profile or provided by the user.

b. For each media unit, Extract each media object's customization parameters (e.g.: material information, lighting, motion, orientation, visibility)—(step 420)

c. Extract each media unit's customization rules (step 430), d. Apply decompression rules according to object type (step 440) (optionally is performed before step 420)

e. Retrieve compressed binary data of objects from encapsulated file or external resources (step 450)

f. Update objects' properties for each frame based on dynamic and static customization rules (step 460)

g. Generate layers of frames according to binary media object data, including updated properties for each frame and the extracted customization rules (step 465)

h. Generate at least one video file from the sequence of generated frames (step 470)

i. Optionally integrate several video files into a single video stream (step 480).

According to some embodiments of the present invention, the customization rules may be dynamic rules updated at the server side in real-time while playing the movie by the user which manages the customized video.

Figure 6:
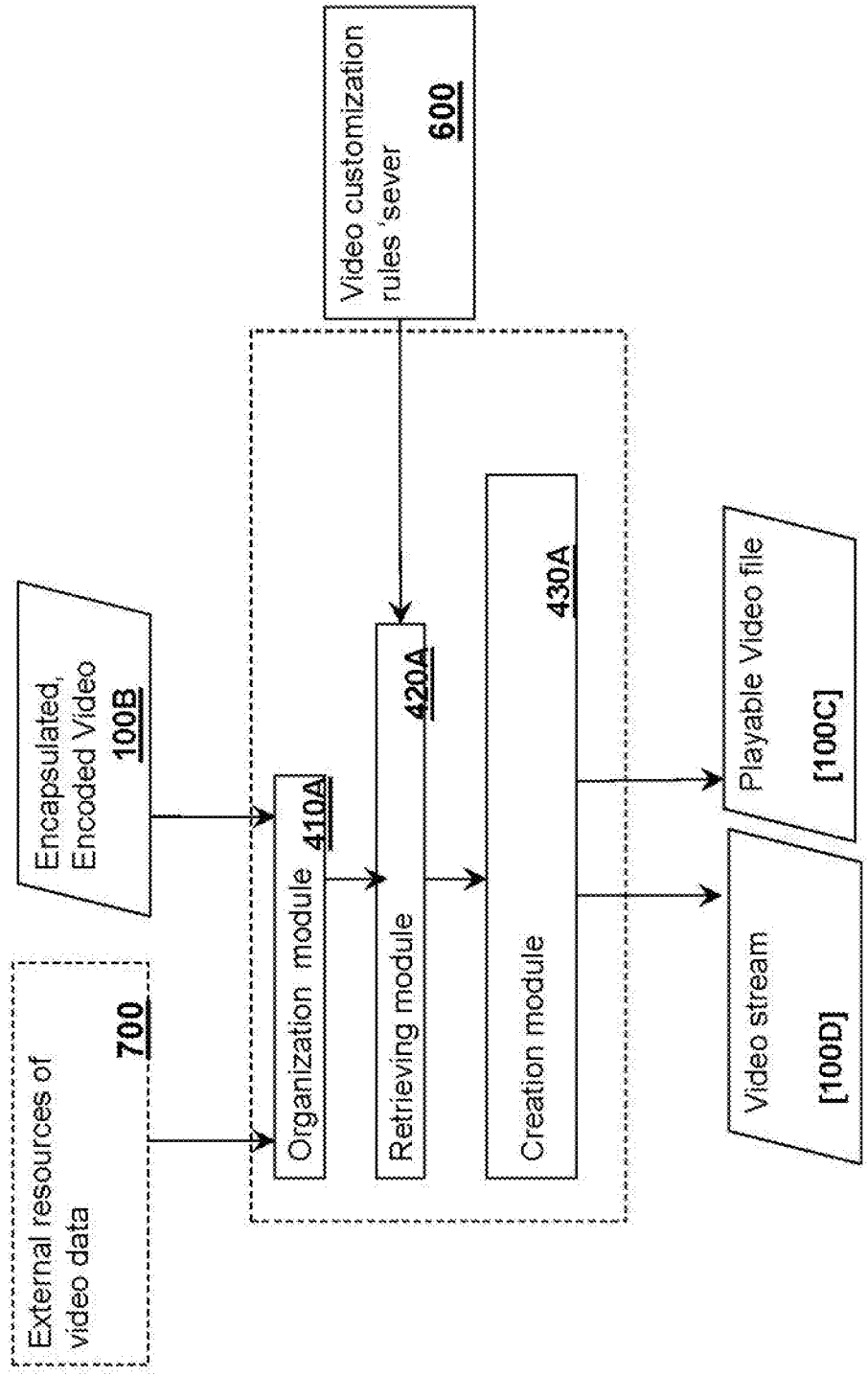
FIG. 6 is a flowchart diagram showing a process carried out by a video decoder-generator module, according to some embodiments of the invention.

FIG. 6 is a block diagram of an Encapsulated Video decoder-generator module, according to some embodiments of the invention. The Video encapsulation decoder-generator module is comprised of:

a. an organization module 410A for determining the media units to be played and order of playing them based on organization and selection rules using customization parameters retrieved from user profile or entered by the user, b. a retrieving module 420A for decompressing and extracting media object properties from encapsulated files, retrieving binary data of objects from encapsulated files or external resources, extracting relevant media unit customization rules from the encapsulated files or from a customization video rules sever c. a creation module for generating at least one video file or stream by applying retrieved customization rules using objects binary data and objects properties based on target user or environment characteristics and/or integrating generated video files into single sequence of video stream.

The system of the present invention may include, according to certain embodiments of the invention, machine readable memory containing or otherwise storing a program of instructions which, when executed by the machine, implements some or all of the apparatus, methods, features and functionalities of the invention shown and described herein. Alternatively or in addition, the apparatus of the present invention may include, according to certain embodiments of the invention, a program as above which may be written in any conventional programming language, and optionally a machine for executing the program such as but not limited to a general purpose computer which may optionally be configured or activated in accordance with the teachings of the present invention. Any of the teachings incorporated herein may wherever suitable operate on signals representative of physical objects or substances.

Unless specifically stated otherwise, as apparent from the following discussions, it is appreciated that throughout the specification discussions, utilizing terms such as, "processing", "computing", "estimating", "selecting", "ranking", "grading", "calculating", "determining", "generating", "reassessing", "classifying", "generating", "producing", "stereo-matching", "registering", "detecting", "associating", "superimposing", "obtaining" or the like, refer to the action and/or processes of a computer or computing system, or processor or similar electronic computing device, that manipulate and/or transform data represented as physical, such as electronic, quantities within the computing system's registers and/or memories, into other data similarly represented as physical quantities within the computing system's memories, registers or other such information storage, transmission or display devices. The term "computer" should be broadly construed to cover any kind of electronic device with data processing capabilities, including, by way of non-limiting example, personal computers, servers, computing system, communication devices, processors (e.g. digital signal processor (DSP), microcontrollers, field programmable gate array (FPGA), application specific integrated circuit (ASIC), etc.) and other electronic computing devices.

The present invention may be described, merely for clarity, in terms of terminology specific to particular programming languages, operating systems, browsers, system versions, individual products, and the like. It will be appreciated that this terminology is intended to convey general principles of operation clearly and briefly, by way of example, and is not intended to limit the scope of the invention to any particular programming language, operating system, browser, system version, or individual product.

It is appreciated that software components of the present invention including programs and data may, if desired, be implemented in ROM (read only memory) form including CD-ROMs, EPROMs and EEPROMs, or may be stored in any other suitable typically non-transitory computer-readable medium such as but not limited to disks of various kinds, cards of various kinds and RAMs. Components described herein as software may, alternatively, be implemented wholly or partly in hardware, if desired, using conventional techniques. Conversely, components described herein as hardware may, alternatively, be implemented wholly or partly in software, if desired, using conventional techniques.

Included in the scope of the present invention, inter alia, are electromagnetic signals carrying computer-readable instructions for performing any or all of the steps of any of the methods shown and described herein, in any suitable order; machine-readable instructions for performing any or all of the steps of any of the methods shown and described herein, in any suitable order; program storage devices readable by machine, tangibly embodying a program of instructions executable by the machine to perform any or all of the steps of any of the methods shown and described herein, in any suitable order; a computer program product comprising a computer useable medium having computer readable program code, such as executable code, having embodied therein, and/or including computer readable program code for performing, any or all of the steps of any of the methods shown and described herein, in any suitable order; any technical effects brought about by any or all of the steps of any of the methods shown and described herein, when performed in any suitable order; any suitable apparatus or device or combination of such, programmed to perform, alone or in combination, any or all of the steps of any of the methods shown and described herein, in any suitable order; electronic devices each including a processor and a cooperating input device and/or output device and operative to perform in software any steps shown and described herein; information storage devices or physical records, such as disks or hard drives, causing a computer or other device to be configured so as to carry out any or all of the steps of any of the methods shown and described herein, in any suitable order; a program pre-stored e.g. in memory or on an information network such as the Internet, before or after being downloaded, which embodies any or all of the steps of any of the methods shown and described herein, in any suitable order, and the method of uploading or downloading such, and a system including server/s and/or client/s for using such; and hardware which performs any or all of the steps of any of the methods shown and described herein, in any suitable order, either alone or in conjunction with software. Any computer-readable or machine-readable media described herein is intended to include non-transitory computer- or machine-readable media.

Any computations or other forms of analysis described herein may be performed by a suitable computerized method. Any step described herein may be computer-implemented. The invention shown and described herein may include (a) using a computerized method to identify a solution to any of the problems or for any of the objectives described herein, the solution optionally includes at least one of a decision, an action, a product, a service or any other information described herein that impacts, in a positive manner, a problem or objectives described herein; and (b) outputting the solution.

The scope of the present invention is not limited to structures and functions specifically described herein and is also intended to include devices which have the capacity to yield a structure, or perform a function, described herein, such that even though users of the device may not use the capacity, they are, if they so desire, able to modify the device to obtain the structure or function.

Features of the present invention which are described in the context of separate embodiments may also be provided in combination in a single embodiment.

For example, a system embodiment is intended to include a corresponding process embodiment. Also, each system embodiment is intended to include a server-centered "view" or client centered "view", or "view" from any other node of the system, of the entire functionality of the system, computer-readable medium, apparatus, including only those functionalities performed at that server or client or node.

The invention claimed is:

1. A system for generating customized video from an encapsulated video file, said system comprised of:
    builder module for creating an encapsulated media file containing at least one media unit and multiple parameters types data thereof, wherein the encapsulated media file includes video data and video customization data, said encapsulated media file being configured for de-capsulation thereof for playing content thereof by generating video frames based on objects parameter data, according to defined parameters data, defined customization rules of static object properties, wherein the builder module comprises:
    preparation module configured to determine the at least one media unit for encapsulation, each media unit comprising a basic media content constructed from the video frames, wherein each frame is constructed of static layers and dynamic layers;
    wherein for each of said determined media unit frames and layers, properties of each defined media object are defined for each video frame based on defined dynamic motion rules and defined customization rules;
    organization module configured to determine media units to be played and order of playing based on customization rules based on customization parameters retrieved from a user profile; and
    a decoder module and designated video player on a client device, which receive the encapsulated media file and play customized decoded video files based on the encapsulated video, wherein said decoder module applies all of the following steps:
        determine media units to be played and order of playing based on customization rules, wherein said customization rules are applied or set according to said customization parameters such as environmental or contextual parameters, retrieved from a user's profile;
        for each media unit, extract each media object's customization parameters;
        extract each media unit's customization rules, applied or set according to the user profile, current context and environment data, wherein the customization rules comprise:
            appearance customization rules that apply to parameters which have a visible effect on the customized video including inserting a specific username or image in a sequence of the customized video; and
            selection customization rules that apply to parameters which determine the media units to be displayed in the determined order of playing media units;
        update objects' properties for each frame based on dynamic and static customization rules;
        generate layers of frames according to media object data, including updated properties for each frame based on extracted customization rules;
        generate at least one video file from a sequence of generated frames;
    wherein said preparation module, said organization module, and said builder module comprise one or more processors, operatively coupled to non-transitory computer readable storage devices, on which are stored modules of instruction code, wherein execution of said instruction code by said one or more processors implements said preparation module, said organization module, and said builder module.

2. The system of claim 1 wherein each customized video can be defined as static or dynamic.

3. The system of claim 1 wherein the encapsulation further includes defining extension functionalities.

4. The system of claim 1 wherein the encapsulation further includes defining shader parameters of 3D effects.

5. The system of claim 1 further comprising adding data of alternative or additional objects or adding external resources links to objects.

6. The system of claim 1 wherein a user is enabled to add data of alternative or additional objects.

* * * * *